(12) United States Patent
Chan

(10) Patent No.: US 6,760,759 B1
(45) Date of Patent: Jul. 6, 2004

(54) SYSTEM TO SUPPORT MOBILE VISUAL COMMUNICATIONS

(75) Inventor: Chung Chan, Waban, MA (US)

(73) Assignee: Mtel Limited, Wanchai (HK)

( * ) Notice: Subject to any disclaimer, the term of this patent is extended or adjusted under 35 U.S.C. 154(b) by 0 days.

(21) Appl. No.: 09/564,352

(22) Filed: May 1, 2000

Related U.S. Application Data

(60) Provisional application No. 60/186,529, filed on Mar. 2, 2000, and provisional application No. 60/167,503, filed on Nov. 24, 1999.

(51) Int. Cl.[7] ............................. G06F 15/16; H04Q 7/20
(52) U.S. Cl. .................. 709/219; 709/249; 455/426.02
(58) Field of Search ............................. 707/2–10, 203; 709/217, 200, 203, 219, 249, 250; 455/426.2, 3.01

(56) References Cited

U.S. PATENT DOCUMENTS

| | | | | |
|---|---|---|---|---|
| 5,551,023 A | * | 8/1996 | Alonso ........................... | 707/8 |
| 5,642,478 A | * | 6/1997 | Chen et al. .................... | 714/45 |
| 5,835,721 A | * | 11/1998 | Donahue et al. ............. | 709/224 |
| 5,924,096 A | * | 7/1999 | Draper et al. .................. | 707/10 |
| 5,974,238 A | * | 10/1999 | Chase, Jr. .................... | 709/248 |
| 5,978,833 A | | 11/1999 | Pashley et al. ............. | 709/200 |
| 6,029,170 A | * | 2/2000 | Garger et al. ............... | 707/100 |
| 6,185,585 B1 | * | 2/2001 | Sequeira ...................... | 715/513 |
| 6,199,081 B1 | * | 3/2001 | Meyerzon et al. .......... | 715/513 |
| 6,229,823 B1 | | 5/2001 | Scarmalis .................... | 370/477 |
| 6,292,833 B1 | * | 9/2001 | Liao et al. ................... | 709/229 |
| 6,295,457 B1 | * | 9/2001 | Narayanaswamy ......... | 455/466 |
| 6,334,056 B1 | * | 12/2001 | Holmes et al. .............. | 455/445 |
| 6,401,085 B1 | * | 6/2002 | Gershman et al. ............. | 707/4 |
| 6,430,624 B1 | * | 8/2002 | Jamtgaard et al. .......... | 709/246 |
| 6,442,479 B1 | * | 8/2002 | Barton ........................ | 701/213 |
| 6,463,463 B1 | * | 10/2002 | Godfrey et al. ............. | 709/206 |
| 6,473,609 B1 | * | 10/2002 | Schwartz et al. ........... | 455/406 |
| 6,484,212 B1 | * | 11/2002 | Markowitz et al. ......... | 709/246 |
| 6,529,724 B1 | * | 3/2003 | Khazaka et al. ............. | 455/405 |
| 2002/0016829 A1 | * | 2/2002 | Defosse ....................... | 709/217 |
| 2002/0019985 A1 | * | 2/2002 | Fuccello et al. ............. | 725/133 |
| 2002/0046084 A1 | * | 4/2002 | Steele et al. .................. | 705/14 |
| 2002/0049833 A1 | * | 4/2002 | Kikinis ....................... | 709/219 |
| 2002/0052916 A1 | * | 5/2002 | Kloba et al. ................ | 709/203 |
| 2002/0068554 A1 | * | 6/2002 | Dusse ......................... | 455/419 |
| 2003/0055816 A1 | * | 3/2003 | Paine et al. .................... | 707/3 |

FOREIGN PATENT DOCUMENTS

| | | |
|---|---|---|
| EP | 0 875 878 | 11/1998 |
| EP | 0 966 138 | 12/1999 |
| EP | 0 982 672 | 3/2000 |
| EP | 1 045 562 A2 | 10/2000 |
| WO | WO 00/21269 | 4/2000 |
| WO | WO 00/22794 | 4/2000 |
| WO | WO 00/76134 A1 | 12/2000 |

\* cited by examiner

*Primary Examiner*—Krisna Lim
(74) *Attorney, Agent, or Firm*—Weingarten, Schurgin, Gagnebin & Lebovici LLP

(57) ABSTRACT

A set of applications to facilitate mobile communications and use of the Internet are bundled to allow the wireless environment to tailored to the handle the load imposed by WEB surfing. The applications include a quick connection to the server, validation of user and user device, resumption of disconnected sessions, and snapshot quantized information delivery. In addition, fast service for likely requested location specific information, search narrowing before search, user behavior habit learning speed-up, consideration of Internet contractual issues, and a speedy search engine make searching more timely. Reliability of information pages is assured by authenticating the updates before they are placed in local storage. Applications to implement this include online authenticated snapshot update provisioning, Internet page conversion tools, tailored Internet page conversion tools, and Information Content Provider tools. The tools learn based on the activities of the user, moving often r tailored to the presentation device, snapshot creation tools requested data into local storage for faster delivery.

28 Claims, 13 Drawing Sheets

FIG. 1

*10* — LATEST NEWS CNN.com
Wednesday, April 19, 2000
Updated every 15 minutes
- Court rules Elian Gonzalez must stay in U.S. until asylum appeal heard
- Emotional dedication of Oklahoma City memorial offers time to grieve
- Business: AMR Quarterly Profit Beats Expectations
- Sports: Favorites Tumble in Monte Carlo Tournament

More News...

WEATHER SEARCH

[ Go ]
Enter City Name or Zip Code

TOP PICKS

4.7: CD/Download
5c! Calls. No Fees!
Buy Software Online
Consolidate Debt
Get a Web Site
Horoscopes
Online Games

SHOP NOW

Baby Clothes
Beauty & Fragrance
Discount Outlets
Software

WEB TOOLS

Book Flights
Calendar
Communications Center
Communities
Hardware Reviews
Make Better Decisions
Netscape 6
Plug-ins
Shareware
SmartUpdate
Tech Resources

---

Netscape Netcenter

| Business | Free Time |

MARKET CENTER
Stock Quotes by
SOLOMON SMITH BARNEY

[_____] [Quote]

☑ Symbol ☐ Name

| SYMBOL | PRICE | CHANGE |
|--------|-------|--------|
| DJIA | 10,674.90 | -92.50 |
| Nasdaq | 3,706.41 | -87.16 |
| S&P 500 | 1,427.47 | -14.14 |

As of April 19, 2000:5:40 pm ET

Quotes delayed at least 20 mins.
Disclaimer

BUSINESS NEWS
Latest from
CBS MarketWatch
- Technology News from CNET

SHIPPING CENTER
- FedEx Shipping
- Tracking
- Dropoff Locator
- Rate Finder

CAREER CENTER
- Find A Job
- Post A Job
- Post A Resume eBUSINESS BASICS
7 Simple steps to a successful online business free Click here!

Get Additional Help
- Pay Bills Online
- Human Resources
- Banking & Finance
- Insurance
- Research
- Business Service Quotes

---

*14*

Search Shortcuts     Shoppin
Classifieds        Office Supplies
Decision Guides    Maps/Directions
Directory          People Finder
Job Search         Yellow/Pages

Today's Feature
No Place Like Home
Kansas anymore, bu be? Find the cities wi crime, good schools, get ready to move. C
Get a Map | Find a J Company        SPEAKERS        Tech
                                Smal
                                Stocl
                                URL
                                Tavo Click here for a Channels
FREE TRIAL    Audio > Netscape Radi
Issue of      Autos > New Cars , Us
eCompany      Business > Research
NOW – the new Computing & Internet
magazine all  Entertainment > Movie
about         Family > Babies, Teens
e-business!   Games > Play Online, F
              Health > Nutrition, Fitne
              Lifestyles > Weddings,
              Local > Dining, Movies,
              Netscape > Developers
              News > Biz, Politics, Sp
              Personal Finance > In
              Real Estate & Homes
              Research & Learn > R
              Shopping > Computers
              Small Business > eBu
              Sports > MLB, NHL, N
              Travel > Reservations,
              What's New > What's (

SYSTEM TO SUPPORT MOBILE VISUAL COMMUNICATIONS

CROSS REFERENCE TO RELATED APPLICATIONS

This application claims priority to U.S. provisional patent application No. 60/186,529 filed Mar. 2, 2000, entitled: MOBILE VISUAL COMMUNICATION TECHNOLOGY, and U.S. provisional patent application No. 60/167,503, entitled: MOBILE VISUAL COMMUNICATION TECHNOLOGY, filed Nov. 24, 1999 and incorporated herein by reference.

STATEMENT REGARDING FEDERALLY SPONSORED RESEARCH OR DEVELOPMENT

N/A

BACKGROUND OF THE INVENTION

The present invention relates generally to a support system for dial-up Internet communications and specifically to a system tailored for wireless dial-up access from mobile telephones and personal data organizers.

Three capabilities have become available to improve communication and data availability in recent history—the mobile telephone, the personal data assistant and the Internet. The mobile telephone has been expanding its influence and services. Such expanded services include incorporating pager functions, call waiting, caller ID and more recently a screen for a mobile telephone to allow visual communication either of text or graphics. The mobile telephone industry has developed a wireless application protocol (WAP) which supports integration of digital data and a wireless modem in a mobile telephone.

The personal data assistant (PDA) is becoming vital to the typical professional and useful to anyone. The PDA, while coming in various sizes, incorporates applications for addresses, schedules, to do lists, expenses and other personal services. Communication is typically through a small screen and either a touch pad or small keyboard. While common PDA's have black and white screens, trends are leading toward color screens. These two devices, the mobile phone and the PDA, seem to be moving toward an extended handheld unit which will keep personal applications close to the user and allow the user to connect to the world via a wireless connection.

The Internet provides a wide variety of data sources and capabilities. The Internet has emerged as a global communications medium enabling millions of people to share information and conduct business electronically. Its main communication route has been visual, although as the desktops, the current primary means of accessing the Internet, become multi sensory Internet communications will shift that way too. The Internet is now supplying music like CD's and delivering messages like an answering machine. The main assets of the Internet are the ability to access a wide variety of information and the power of the search engines to find such information. The main drawback of the Internet has been the need to be at a connected computer to use the Internet. Only now are wireless modems for portable computers coming into general availability, but these currently require more than the mobile telephone infrastructure to function reliably. Most of the Internet Web resources are formatted for personnel desktop or laptop computer access. The resolution of the monitor and/or liquid crystal display (LCD) ranges from 640×480 to 1600×1200 pixels. The personnel computer can be equipped with a large capacity hard disk drive and a sizeable random access memory (up to 614 Megabytes). The window of each html web page is widely opened and the memory size for a page is large (up to a few Megabytes). The Internet servers for desktop users typically assume that the connection to the desktop has a high bandwidth. The bandwidth requirements for the Internet have been pushing communications technology to provide ever more capable paths to the desktop.

Beginning efforts have been made to utilize extended mobile phones with visual screens to access the Internet. However, current wireless web surfing suffers from the slow wireless data rates, the possible intermittent nature of wireless connectivity, the long down-load time for graphic intensive pages, the cost of waiting for information to cross the Internet as the Internet becomes more congested, and from an inadequate graphical user interface. What is needed is a way to have a handheld mobile web browser appear to be operating at such a high data rate with such a quick response that it does not highlight the Internet traffic congestion. Fast updates of information, a user friendly graphical user interface and web pages tailored for the small screens must be available in handheld units.

BRIEF SUMMARY OF THE INVENTION

The system needed to support mobile Internet access from handheld units centers around two foci, speed and special content. Both of these are served by placing the contents that the user desires as physically close to the user's server as possible. Speed is needed to adapt to the cost structure and low bandwidth of wireless communication and the limitations of the handheld unit screens. Special content is needed to present extensive information in readily interpreted formats that complement the speed services. Speed services can be located either in the handheld unit or in a custom server for mobile handheld net surfing.

One feature of the novel system is an ability, built into the handheld unit, to create search requests to retrieve precisely the information wanted from the network. Such search requests augment the wide ranging search facility already available and guide the user to precisely defining a need so that the number of hits for that request is limited. Another feature in the handheld unit is a quick connect service, a service that identifies the user and his authorization as the handheld unit is connecting and the server is providing the first connection. Another feature in the handheld unit is the ability to interpret tags that allow the handheld unit to download only changing data and maintain static data in the local memory. Current applications require that the entire screen be downloaded.

Speed also implies that the server, the main portal to the Internet has specialized capabilities. One of these capabilities is an ability to convert desktop formatted pages to mobile handheld screen format. This may be a straight conversion of one page to a number of screens or a tailored conversion approved by the information provider. Another capability is a means to access screens tailored for the handheld unit whether the screens are held at the server or on the Internet. Another server capability is communication services that will assure that each transmission is quantified to fill an entire screen in the handheld unit and that maintain a running status that can ride through a wireless service outage. Major improvement in speed comes about because the server is able to access an extensive database filled with information that has been selected based on the user's historical usage and projected needs. Such a database avoids the need to access the full Internet to send data to the handheld unit. The database is updated in real time as the page-based data is updated for the rest of the Internet. A search engine that can distinguish between searches that need to use the Internet and searches that can be centered on the database improves the speed of interaction.

The features that support special content for the handheld mobile user include capabilities to allow content providers to submit updates to their desktop web pages and have that update be formatted both for the desktop and for the handheld screen. The capabilities built into these utilities include the ability to tag dynamic fields, distinguishing them from the static fields in the pages, and reformat the pages to fit on the majority of handheld screens. Similarly, for those information providers who choose not to provide handheld screens on the Internet, but who provide pre-approval, fast custom conversion engines are supplied to allow the information to be accessed as screens with greater facility. Grouping of desirable information and holding that information in the most accessible storage media is a special content of special value to the user. The ability to convert the general desktop web page to a handheld format is provided, but its use is conditioned on the handheld user's explicit request for the conversion. The ability to apply artificial intelligence techniques to the update of information continues the improvement after a user initially subscribes.

BRIEF DESCRIPTION OF THE SEVERAL VIEWS OF THE DRAWING

FIG. 1 is an illustrative example of a web page designed for a desktop;

DETAILED DESCRIPTION OF THE INVENTION

As people have become increasingly dependent on e-mail services, remote access to corporate Intranets and Internet-based services, wireless telephones and handheld organizers that provide mobile access to these resources have become increasingly useful tools. However, the emphasis in today's mobile communication industry is shifting from audio interaction to visual interaction with manufacturers incorporating screens and modems into wireless telephones as an optional front end to those phones. The current low data rate for wireless communications will be improved up to 384 Kbps in a few years with the proposed 3G and Bluetooth technology, a global specification for wireless connectivity. These improvements are designed to operate in a noisy radio environment, to implement a fast acknowledgement and to use a frequency hopping scheme to make the link robust. However, even with these improvements the data rate will still limit applications such as web browsing and full motion video viewing.

The requirements for mobile web browsing include a high-data rate, quick response, avoiding Internet traffic congestion, instant access to information, user friendly GUI and web pages designed with maximum information content and less text. The invention is designed to utilize existing mobile phone wireless infrastructure and supply useful mobile applications such as e-mail, fax, rapid data retrieval and information searching capabilities.

FIG. 1 illustrates a web page 10 as provided to a desktop device. The web page 10 is characterized by extensive use of text, categories designed to suggest areas for exploration and some small dynamic areas 12 where data is regularly updated. Dynamic areas 12 can include headlines, stock market prices or specialized information whose dynamic nature is of interest to a specific user. For a mobile user such dynamic information could include inventory levels, turn around times or other particular information for his company. The desktop page is further characterized by the capability to extend beyond one screen of data. Scroll bars 14 allow viewing more data and provide the opportunity to scroll down or across in a spreadsheet fashion. These features are not optimum for a mobile user. The mobile user is in an unreliable communication environment where drop outs can occur at any time. Therefore, receiving the needed data on one screen increments is an important feature.

Figure 2:
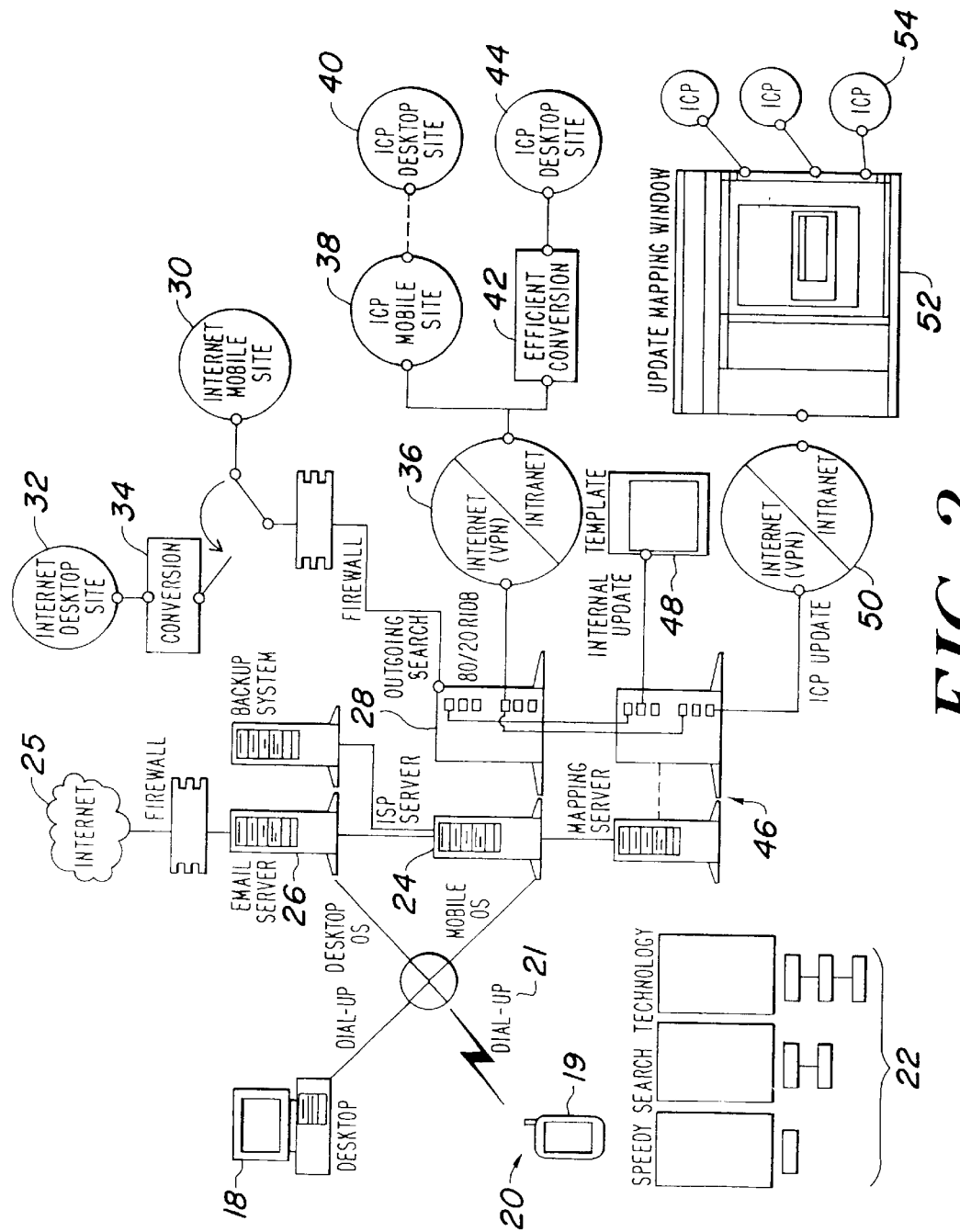
FIG. 2 is a block diagram of a system according to the invention to support mobile visual communications.

FIG. 2 illustrates the system configuration according to the invention for supporting the mobile user in web based visual communication. A mobile user 20 has a small screen and can be connected to the network by dial up 21 over wireless communication links. The mobile user 20 is connected to a network that could be an extension of the one used by desktop user 18. On the handheld unit 19, a number of applications, illustrated by the speedy search application 22, run and complement facilities at the server 24 location. The connection from the handheld unit 19 is made directly to an information service provider (ISP) server 24 which can distinguish the mobile user 20 from the desktop user 18. The ISP server 24 provides specific capabilities for the mobile user and allows the mobile user 20 to access all services available to a desktop user 18, such as e-mail service 26 via the Internet 25. Specific to the mobile user however, are services such as the 80/20 Rule Internal Database (RIDB) 28 which speeds up searches. The database 28 is augmented by a search engine that has access to Internet mobile specific sites 30 and Internet desktop sites 32 which can be converted to a mobile format 34. The search engine further provides Intranet or secure Internet 36 access to specific mobile Internet content provider (ICP) sites 38 that the user may wish to access and the ICP mobile sites 38, which mirror ICP desktop sites 40. Alternately, the search engine can access the information by providing efficient conversion 42 of the ICP's specific desktop information 44.

The ISP server 24 uses a mapping server 46 to track the location of all local 28, Intranet and secure Internet 36 specific data that has a dynamic component stored in the 20/80 RIDB 28. The mapping server 46 manages the updating of available data. For information that is being stored locally, the mapping server 46 and RIDB 28 provide secure updating using an internal update template 48. Alternatively, the mapping server 46 receives updates across the Internet or Intranet 50 from various update facilities 52 and 54.

Figure 3:
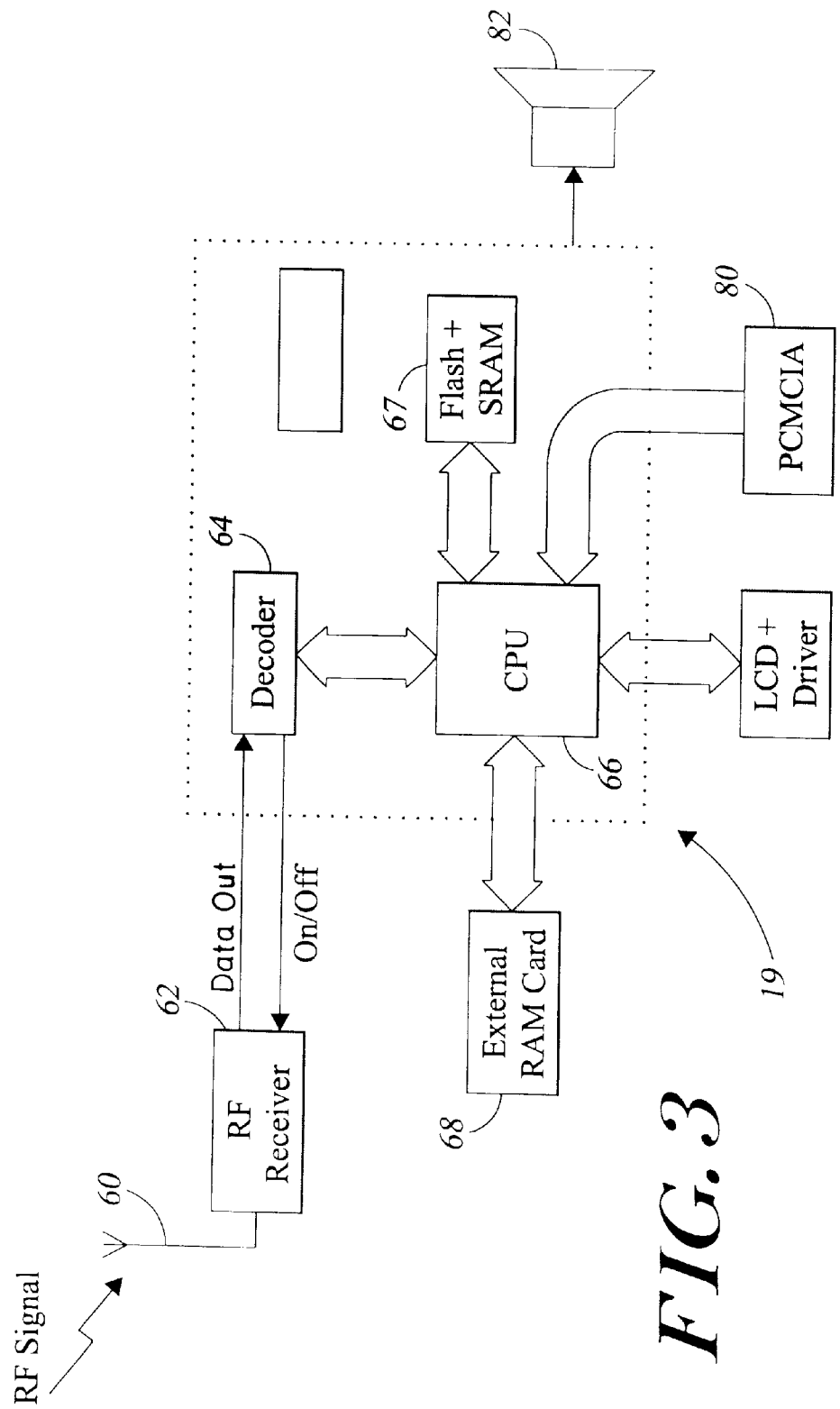
FIG. 3 is a block diagram of a handheld unit.

The block diagram of the handheld unit 19 used by mobile user 20 is shown in FIG. 3. The unit 19 communicates using a radio frequency (RF) signal 60, received by an antenna and RF receiver 62, that is decoded into either voice or data and signals by decoder 64. The signals from the decoder 64 are fed to the CPU 66 which also interfaces with external memory card 68, flash memory 67, display device 84 and interface card 80. The handheld unit 19 retains its speaker 82, display screen and input buttons (not shown) as usually present on a PDA or mobile phone. The handheld unit 19 has greater functionality than either a standard PDA or mobile phone. Once wireless communication is established, the received signals are decoded to determine whether they are audio signals, which are sent to the telephone functionality incorporated in the handheld unit, or digital which then are decoded utilizing the modem portion of the decoder 64. Having extensive memory 68 in the handheld unit 19 allows applications to be placed close to the user for maximum responsiveness and speed.

Figure 4:
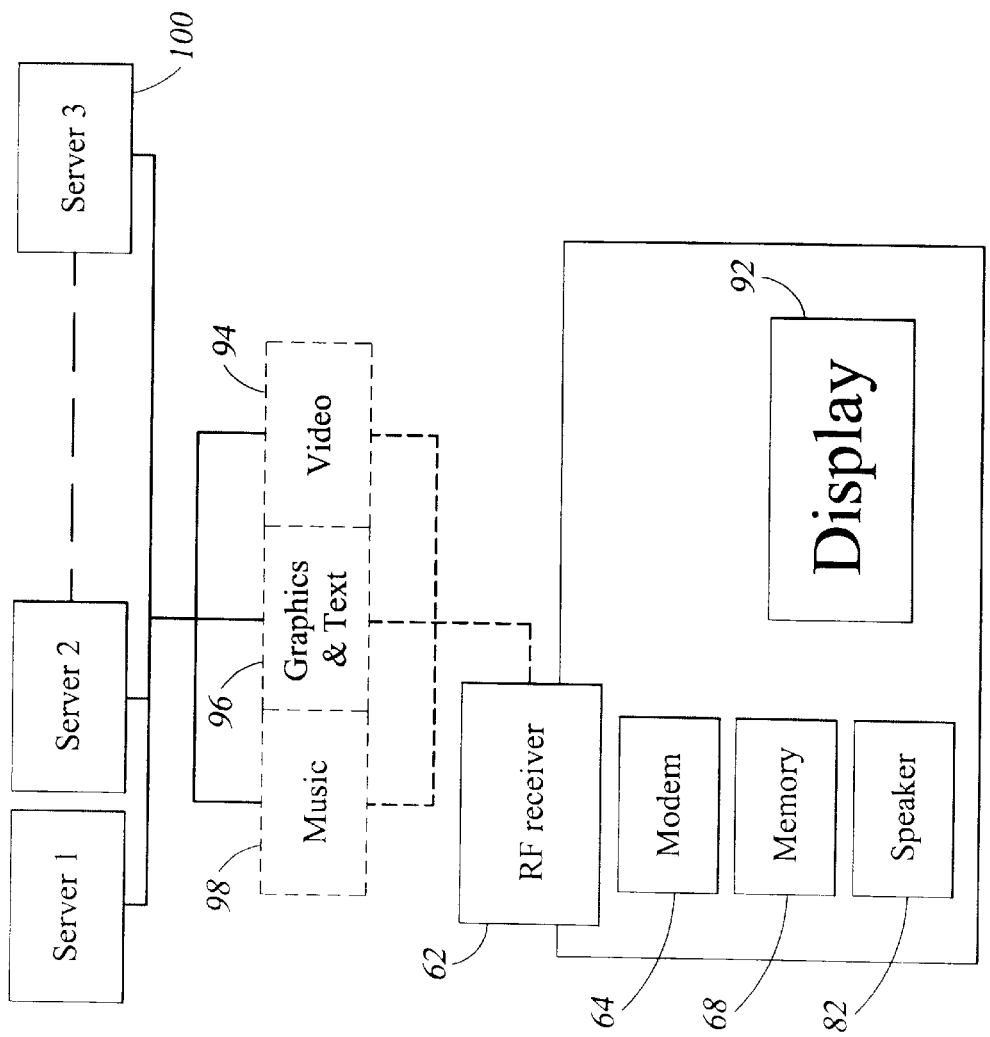
FIG. 4 is a functional block diagram of a handheld unit.

The handheld unit is programmed to recognize and interpret HTML and XML formats, the display and command languages already standard for displaying Web pages. This capability facilitates the creation of screens that are a subset of Web pages. In addition, the WAP protocol can be retained for managing portions of the communications for the unit. FIG. 4 illustrates the functionality included in the handheld unit. Handheld unit 19 is centered on the display 92 with speaker 82, memory 68 and modem 64. These devices together allow the decoders for video 94, graphics and text 96 and music 98 to present the decoded result to the appropriate input/output device for the user. The modem 64 further connects to the RF receiver 62 to receive the input over the air from one of any number of mobile servers 100 able to provide the data requested.

Figure 5:
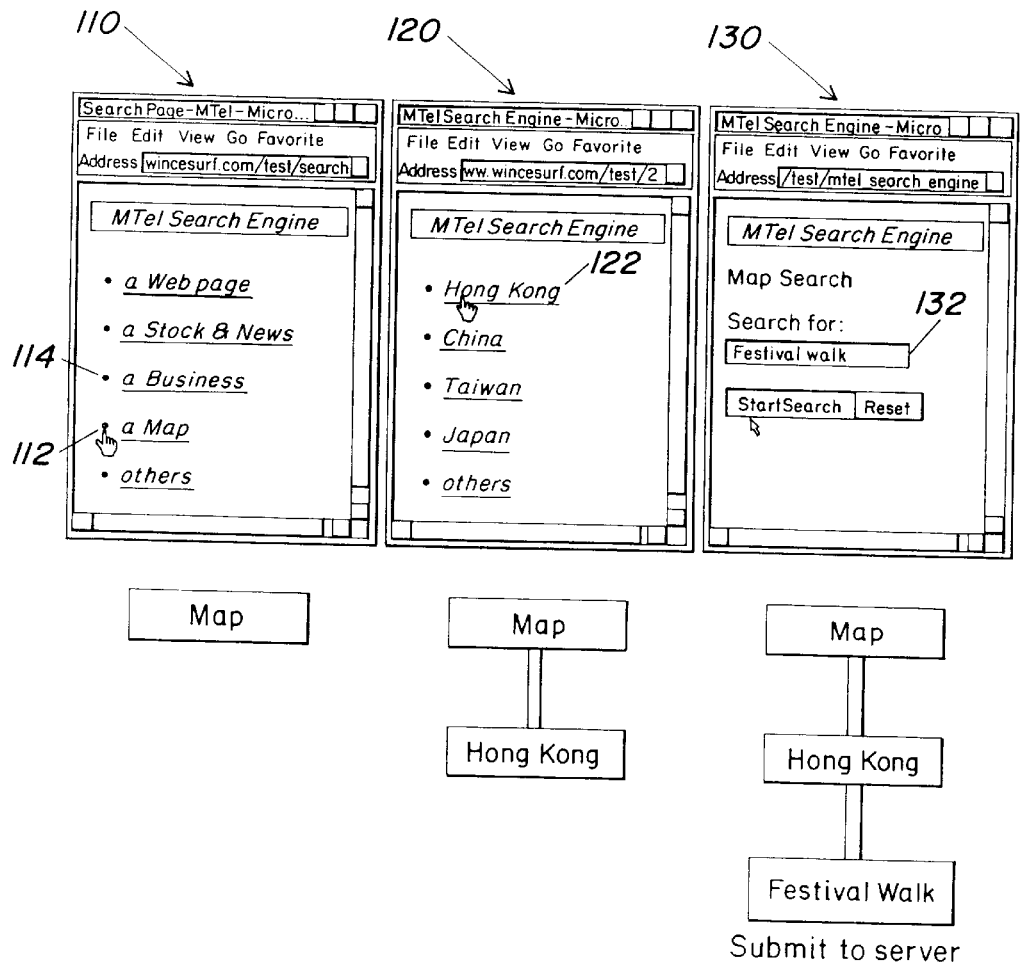
FIG. 5 is an illustration of how a speedy search can be organized on the handheld unit.

One application that is part of the facilities for mobile web surfing is the speedy search application, memory resident in the handheld unit as illustrated in FIG. 5. The search service first presents to the user the types of information the user typically wishes to search for as well as the general alternative. The first menu 110 can be customized by the user so that, for instance, business 114 refers to the inventory for the user's business. Once the user has selected an input, in this example, map 112, the next screen 120 further limits the search, offering targets known to be of interest to the user, such as Asian countries, although the option to enter a different location is offered. In the example, option Hong Kong 122 is selected, and a further narrowing of the search is conducted by presenting a menu 132 of features in the Hong Kong area pulled up from the memory in the handheld unit. At any point, the menus for a screen, such as screen 130 could be downloaded to the handheld unit from the server. Once the user has selected a particular area in the region already chosen, in the example festival walk 132, then the search is submitted to the search engine resident on the server. Because the search is narrowed, the number of hits will be smaller and the specific information can be provided quickly. When the information is found at a location provided by an ICP providing mobile formats, it will be transmitted formatted for the screen of the handheld unit and will utilize symbols rather than words wherever possible. The search engine may further improve the operation of the speedy search application as will be detailed in the description of the search engine.

Figure 6:
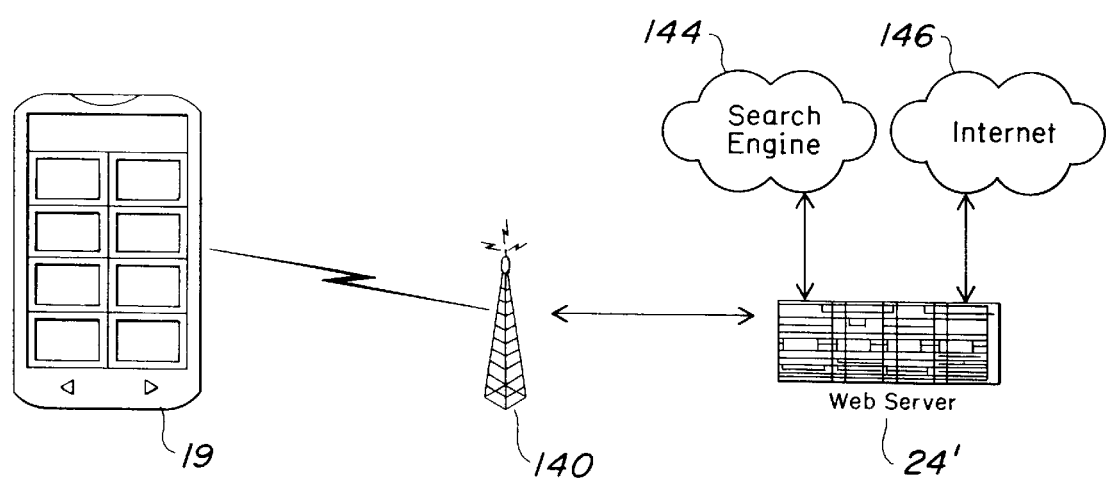
FIG. 6 illustrates the handheld unit connecting to the server through a wireless network.
Figure 7:
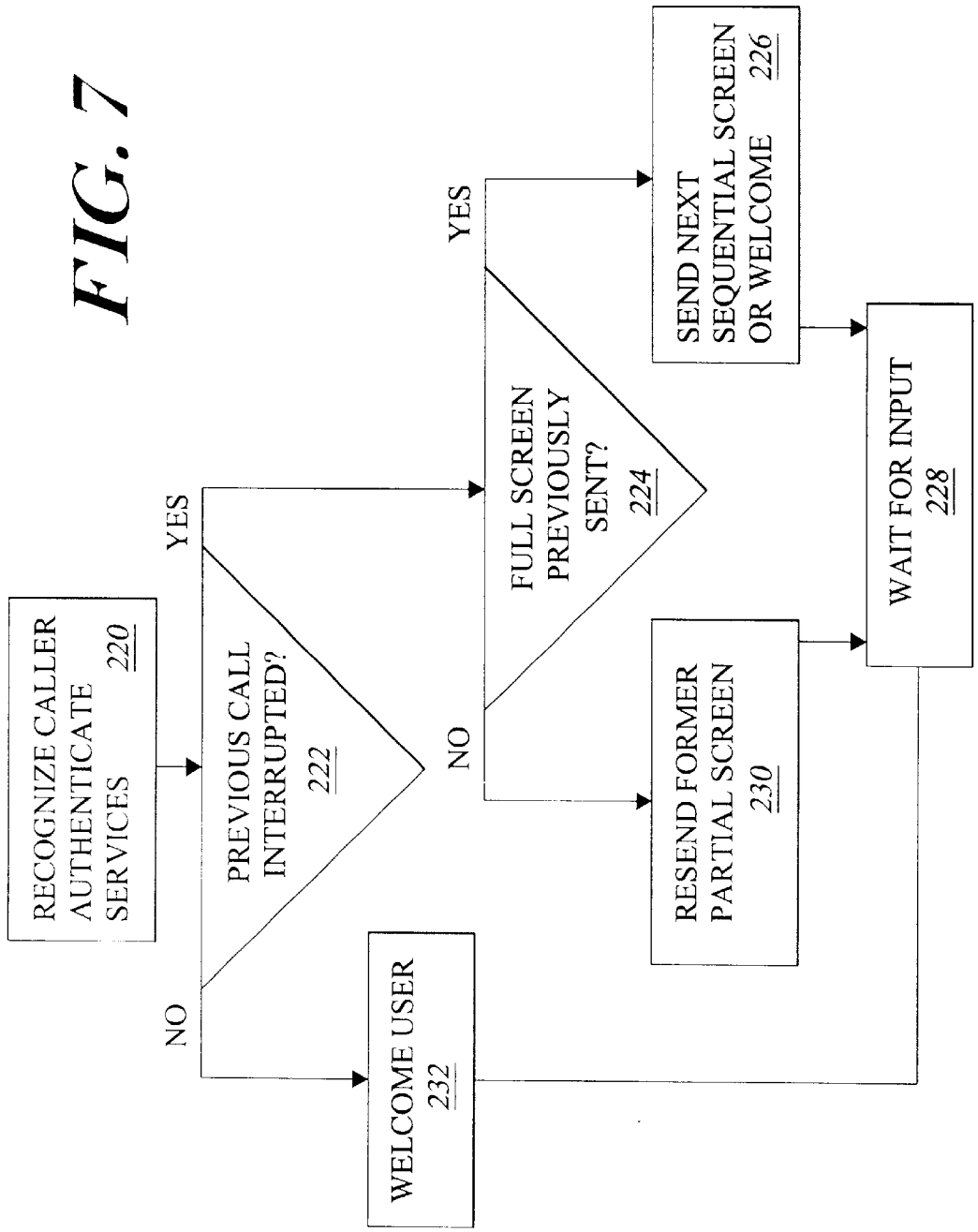
FIG. 7 is a diagram of the speedy connect application.

FIG. 6 illustrates the connectivity of the handheld unit 19 to the mobile web server 24 via wireless links 140 installed throughout the local reception area. This connection is facilitated by a quick handshake protocol executed by the handheld unit 19 and the server 24, illustrated in FIG. 7. The connection from the handheld unit 19 incorporates sufficient information, including the wireless telephone number and account codes, to allow the server 24 to recognize the caller 220. Such recognition 220 includes authenticating the user and pre-authorizing the transactions the user has contracted for. Quick handshake next determines whether there was a recent call that was interrupted 222, where an interruption is defined as not completing a normal sign-off protocol. If there was no interruption, then the user is welcomed 232 and the server awaits input from the user 228. If the previous call was interrupted, the server determines whether a full screen had previously been sent 224. If a full screen had not been sent, then the server repeats the previous transmission 230 and awaits the user's input 228. If a full screen had been sent, then the server sends the next screen in sequence 226 or, if there is no next screen, welcomes the user and awaits the user's input 228. By this mechanism, the quick handshake minimizes the obstacles presented by the wireless environment allowing the user to conduct his business with ease. After the connection is established, the mobile web server provides access to specialized capabilities, such as the mobile search engine 144 as well as full access to the Internet 146.

Figure 8:
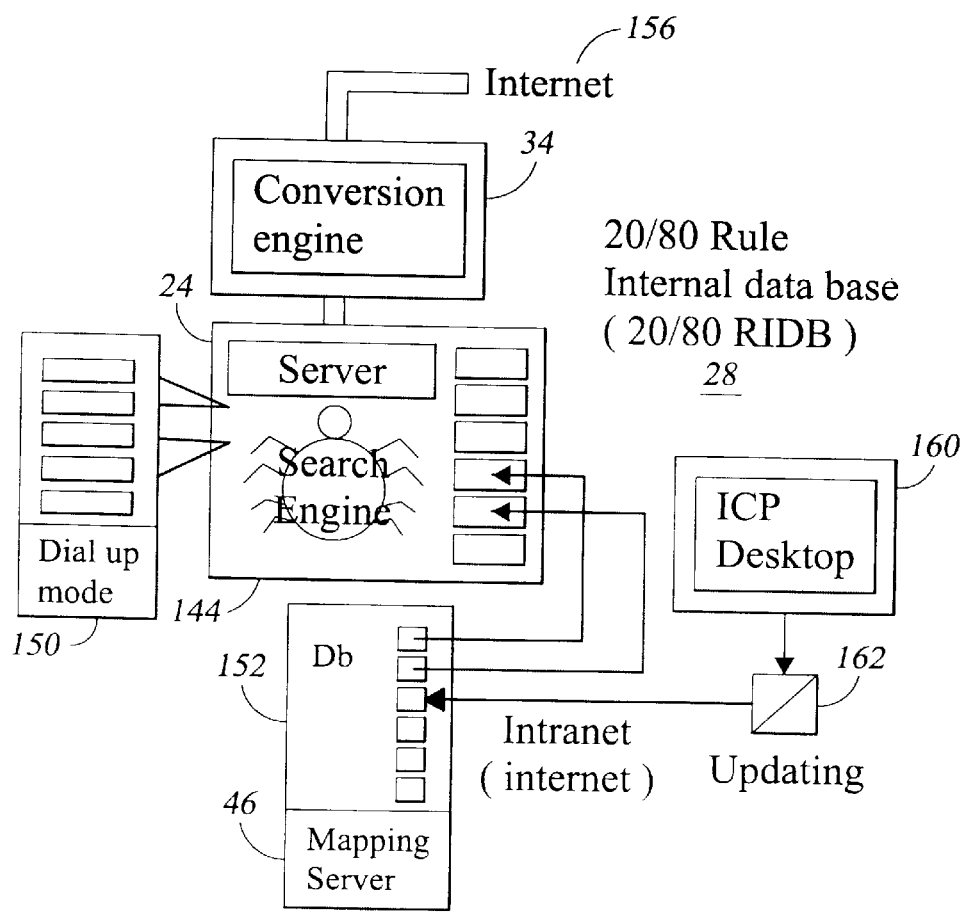
FIG. 8 is a block diagram of a special web server handling the handheld wireless unit.

The mobile web server 24 operation is illustrated in FIG. 8. The server 24 that incorporates the search engine 144 and a 20/80 RIDB database 28 is connected to the mobile user 20 through the dial-up modem interface 150. Data received from the Internet 156 by the server 24 is converted by a conversion engine 154 from the text page format to the screen based handheld unit format. Because the data in the Internet 156 is in many cases under various licensing agreements, the conversion engine 34 will only be invoked at the specific request of the mobile user 20. Therefore, when the information requested by the module user 20 is found on the Internet 156 the server 24 will send a message to the mobile user 20 inquiring whether the user wishes to have the information converted. Only if the user module 20 explicitly requests a conversion of a specific page will the data from that page be converted 154 to the mobile format.

Figure 9:
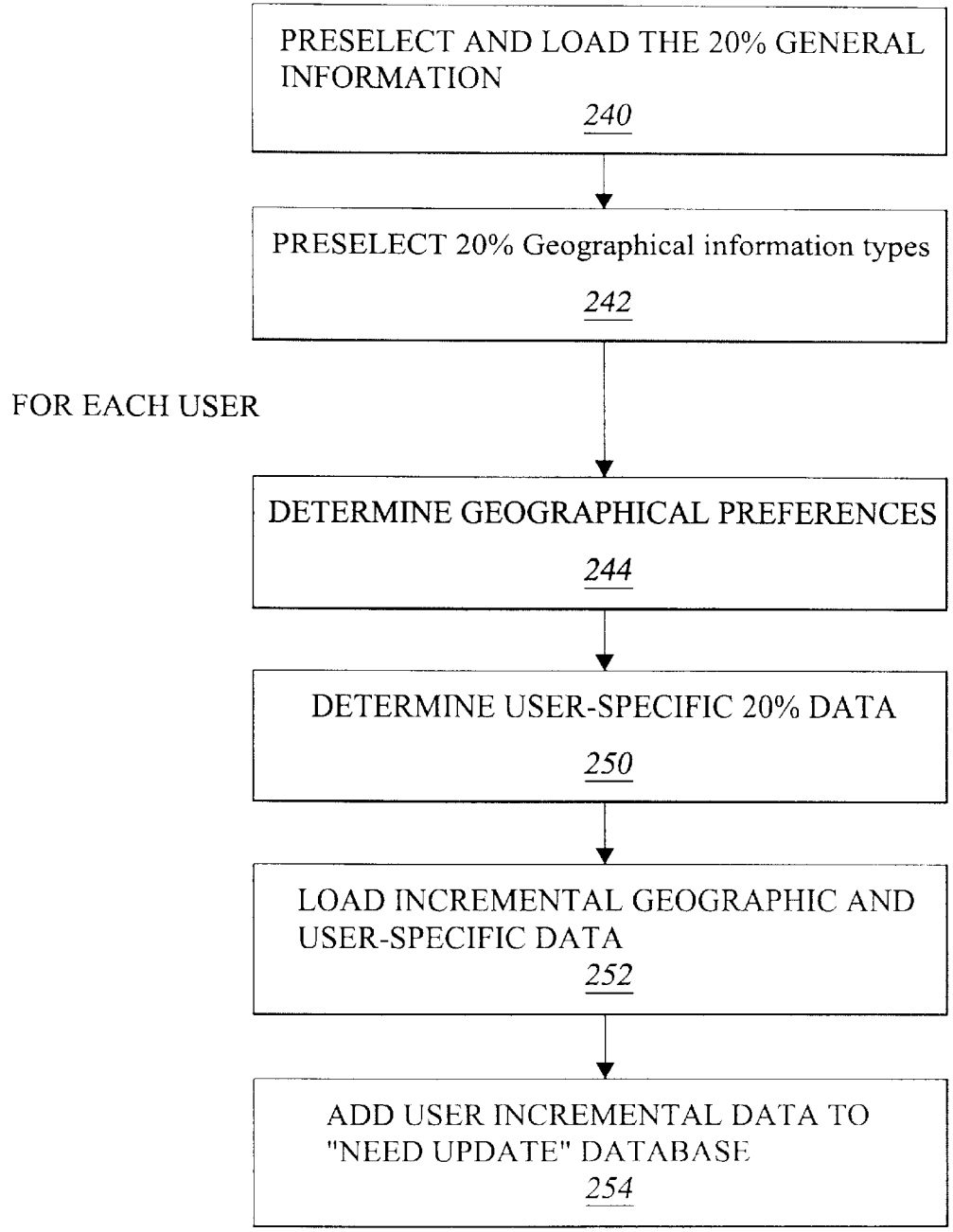
FIG. 9 is a flow diagram of preloading the 20/80 RIDB.
Figure 10:
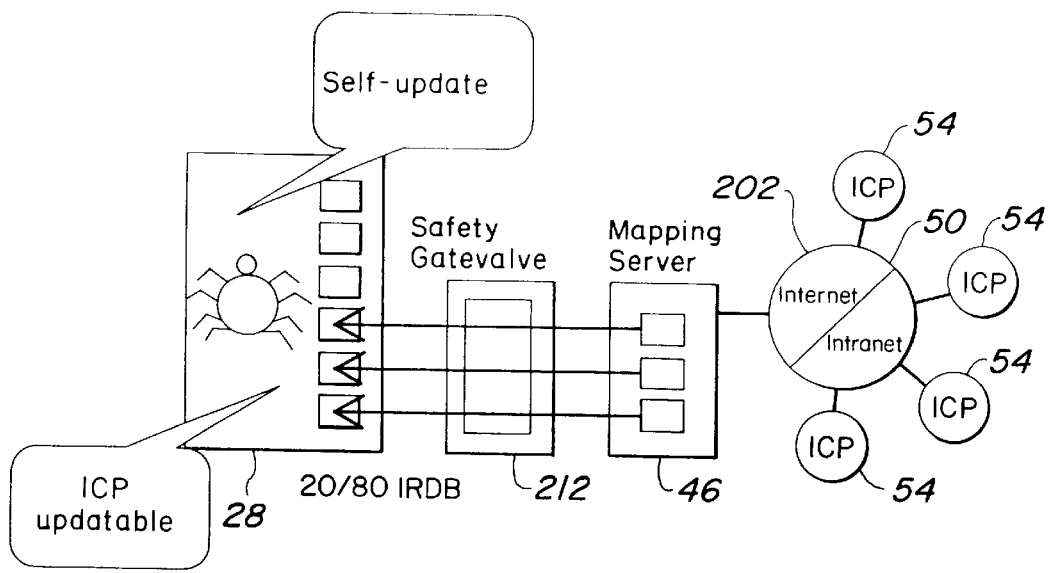
FIG. 10 illustrates updating dynamic data from ICPs on the Internet.
Figure 11:
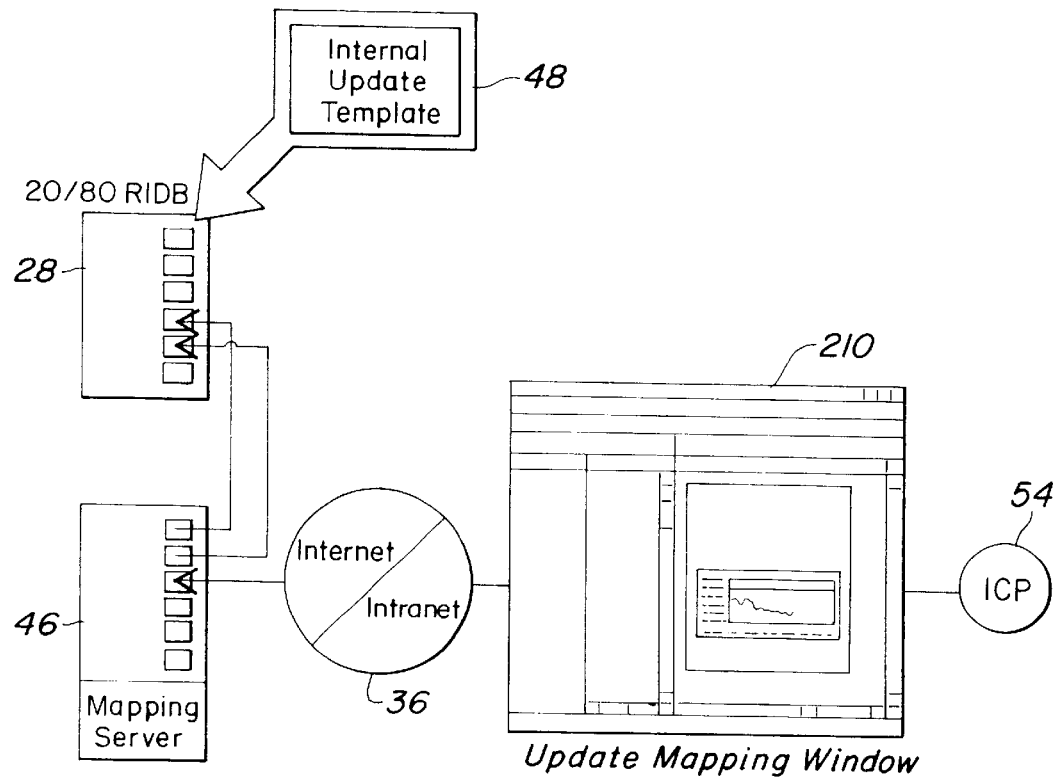
FIG. 11 illustrates the update application updating the data stored in the database.

Integral to the operation of the mobile server is a local database 28 built based on the 20%/80% adage—that 80% of the information that is wanted is found in 20% of the sources. The 20/80 RIDB 28 is populated with information as the server is brought up and as mobile users subscribe to the service. FIG. 9 illustrates the flow chart for preloading the 20/80 RIDB 28. As the server is being planned, the general information that will be a priority is determined and loaded in the database 240. Selection of the information will be a local business decision based on experience and the targeted users. Before users are solicited, the geographical information types will be determined 242. Examples of geographical information types are maps, weather, business sponsors, and transportation facilities. As users are enrolled in the service, they provide information on their target geographical preferences 244 (areas and information types) and their specific information needs 250. The new requests are added to the database 252. The system continues to monitor highly requested data and updates the 20/80 RIDB 254 as needed, as will be described later.

The fields of each screen of information stored in the 20/80 RIDB 44 are indexed and tagged according to common industry practice. The tags identify fields and the time the field was last updated. The objective of the tagging is to reduce the length of transmissions between the handheld unit and the server. Although the tagging logic can be located in either the server or the handheld unit, the sequence of operations where it is performed in the handheld unit will be detailed herein. The server identifies whether a handheld unit can process tags during connection and only expects tag selection communication with a handheld unit so provisioned. In response to a data request from a tag recognizing handheld unit, the server will transmit the tags for a screen rather than the entire screen. The handheld unit compares the tag and last updated time for each field with the same tags from the last time the handheld unit requested this screen. If a field has been undated since it was last requested, the handheld will rerequest that field. The handheld will build the screen from the new fields and the unchanged fields still in its memory. If the prior screen is no longer in memory, the entire screen will be requested. Because only data that is not available in the handheld is sent from the server, the screen is built faster and transmission time is less frequently the gating item.

Referring to FIG. 8, because mach of the data stored in the 20/80 RIDB 28 is dynamic, applications to allow update are provided to ICPs. The mapping server 46 protects the 20/80 RIDB 28 from accidental corruption. The mapping server 46 includes an index to all screen formatted data unique to the particular mobile server 24 and a mirror database 152 of all dynamic components of the 20/80 RIDB. Any information to be updated in the 20/80 RIDB 28 is first updated in the mirror database 152 and transferred to the full database 28. An updating ICP logs into the mapping server via a Virtual Private Internet, a secure Internet, or an Intranet 162, as shown in FIG. 8. This log-in allows the ICP update access only to the update template for its own data. When the ICP completes the update, it signs off with a password to further validate the transaction. The update is then written into the mapping server memory 152. At a later time, the data is transferred from the mapping server mirror memory 152 to the 20/80 RIDB 28.

The ICP updates its desktop database 160. It logs into the mapping server and the information and the notice of update 162 is sent to the mapping server 46 over the Internet or Intranet. After the mapping server 46 has verified the ICP, it extracts the changing information and updates the dynamic database 152. This process frees the ICP from updating only a screen database while assuring that the information in the 20/80 RIDB is reliable and identical to the desktop database.

Figure 12:
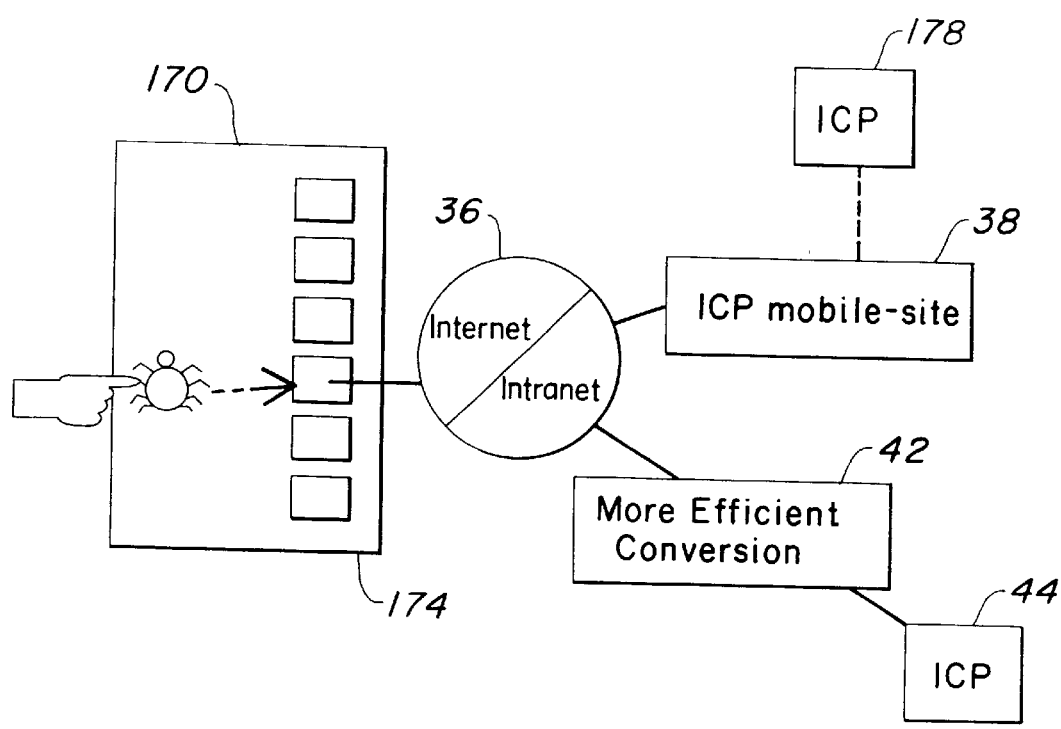
FIG. 12 illustrates how the search engine finds local data.

For ICP's not directly connected to the mapping server, an interface for updating is provided as shown in FIG. 12. The ICPs 54 provide updates over a secure Internet 202 to the mapping server 46. The mapping server 46 determines where the data is in the 20/80 RIDB 28 and meters 212 the changes into the database 28 so that response to mobile users is prioritized over information update.

For data that is sourced from the ISP server itself, an internal update template is utilized. This update does not utilize the mapping server, but passes data directly into the 20/80 RIDB 28 as shown in FIG. 12. External ICPs 54 update using a provided update mapping window 210 before the information is passed through the network 36 to the mapping server 46.

Figure 13:
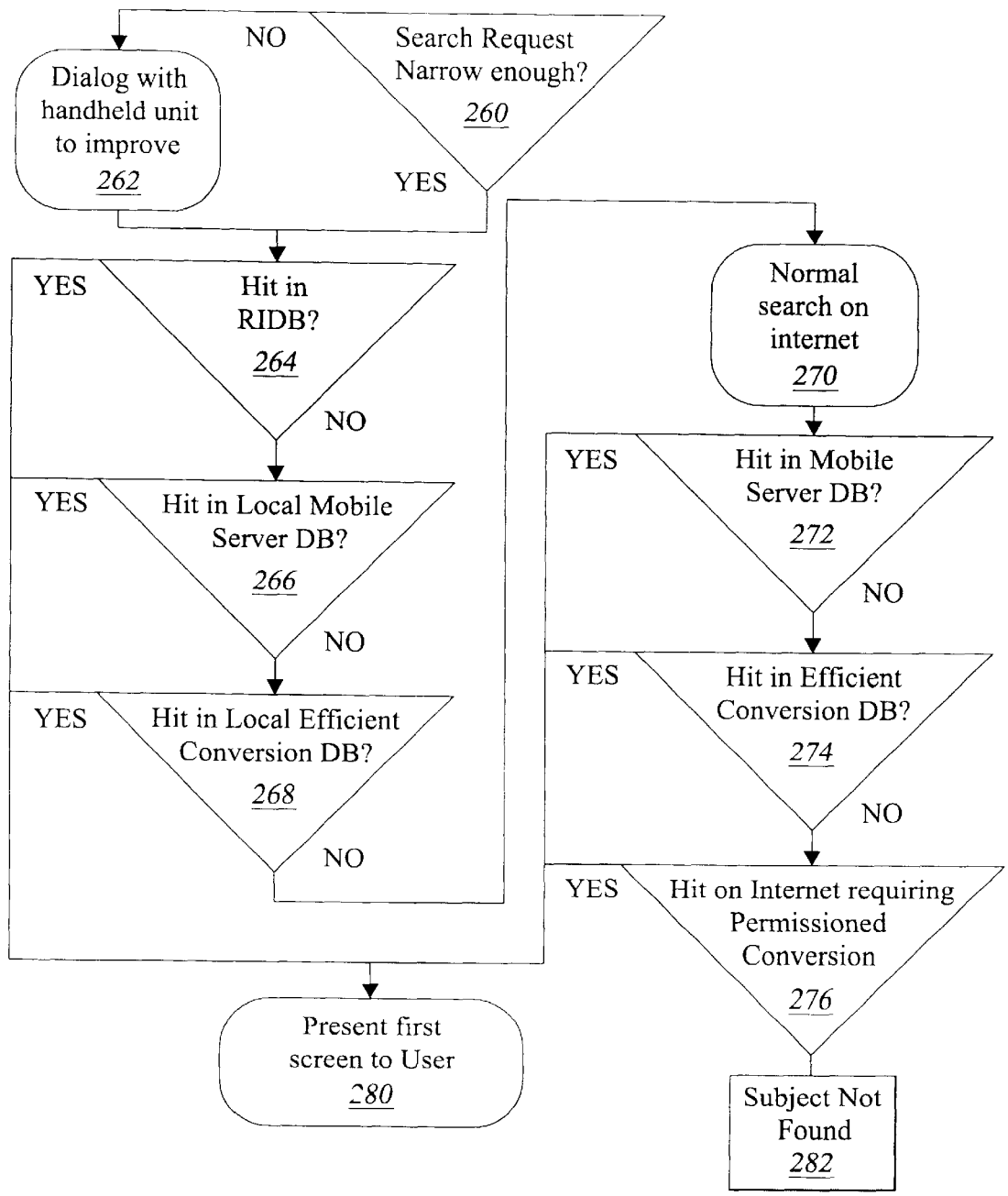
FIG. 13 is a flow diagram of the search engine logic.

The 20/80 RIDB 28 is the fastest source to satisfy a request from a mobile user. However, all information cannot be stored in the 20/80 RIDB 28. The Internet is known to have delays due to routers, bridges and its length, therefore each mobile server incorporates an Intranet connecting it to selected mobile ICP servers. The search engine 144 tracks where information can be found and selects the fastest route. If the information is known to be provided by a related ICP, the search engine 144 finds the route to those ICPs as shown in FIG. 13. The site for an ICP can be on the same Intranet as the mobile server or on a secure Internet 36. The information can be formatted in screens 38 for the mobile user, where the screens reflect the information 40 available to the desktop user. Alternately, the desktop information 44 can be the only information directly available, but an efficient conversion engine 42 will provide the information formatted for screens. The advantage of the efficient conversion engine 42 is that the ICP has authorized the conversion of the desktop information, so the user does not have to specifically request the conversion.

Figure 14:
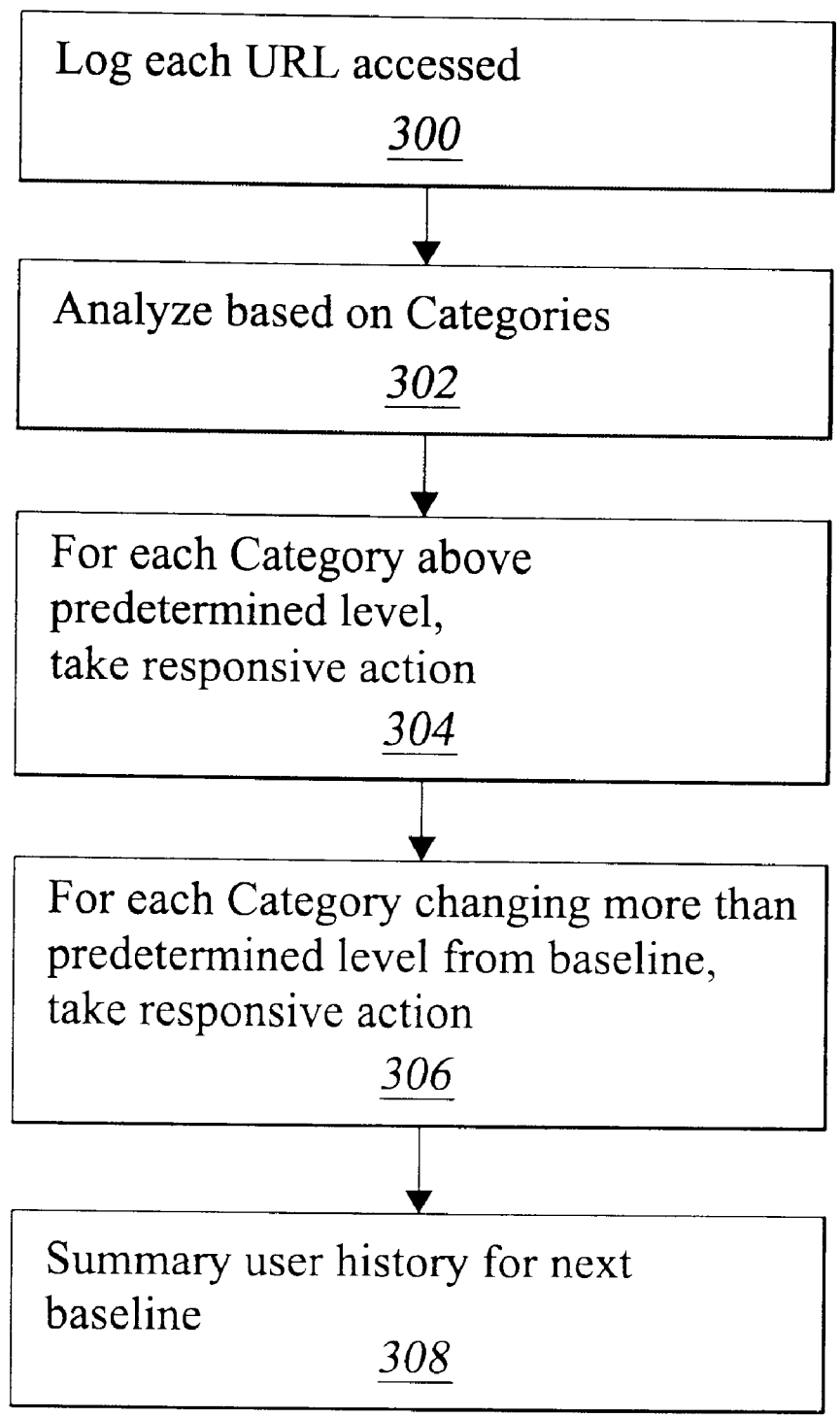
FIG. 14 is a flow diagram of the habit based learning logic.

The search engine, optimized for wireless communication, is shown in FIG. 14. The speed search application is the front end of the search engine. As the search engine becomes familiar with a user's pattern of searches, it will suggest the best way to formulate a search to get the desired information more quickly. Once a search request is received, the sequence of search is as shown in FIG. 14. The search engine first looks in the 20/80 RIDB 28 for the desired information 264. Because there is no network access needed to retrieve data from the 20/80 RIDB 28, this is the quickest access. The next preferred information sources are the ICP mobile sites on the local Intranet 266. After the local ICP mobile sites, the desktop sites provided with efficient conversion engines are the next preferred 268. If the information has not been found in the locally connected sources, a search on the Internet is initiated 270. The results of this search are further analyzed, with the responses from networked mobile servers 272 before the efficiently converted database 274 or the standard Internet information 276 after requested conversion. In each case, the search engine returns a screen to the user, or tells the user that the information cannot be found. As the search engine 28 learns which desktop Internet sites are frequently accessed, it will periodically access the site, convert the data and store it in the 20/80 RIDB. The user will still need to specifically ask for a conversion, but will not have to wait for the information to travel the Internet after making the specific request.

The coverage of the 20/80 RIDB 28 is extended based on an analysis of behavior habit logs (BHL) of each user as illustrated by FIG. 14. On an ongoing basis, each URL accessed via the Internet is logged in the BHL database 300. At predetermined intervals, based on user requirements and variables such as performance guarantees, the BHL database is analyzed for categories such as frequency of visits to a URL and time of access to a URL. For each category that exceeds a predetermined threshold level, responsive action, such as storing the dynamic component of the URL, is initiated 304. For each category where the high usage is time dependent, a time-based fast storage is initiated. In addition to analyzing URL accesses to add data to the 20/80 RIDB, the accesses to the 20/80 RIDB are analyzed to find categories having significant changes from previous usage levels 306. These categories become candidates for removal from the 20/80 RIDB. The BHL log analysis is stored as a summary by the user as a baseline for the next analysis 308.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A system to enable mobile wireless data communication by a plurality of handheld units, said system comprising:

at least one computer system including peripherals to execute applications and support connections from said plurality of handheld units;

at least one handheld unit operative to target searches for information;

an expedited connection facility between said at least one computer system and said plurality of handheld units, the expedited connection facility being configured to automatically establish a data connection with said at least one computer system;

a dedicated mobile server information services provider (ISP) to receive mobile wireless connections from said at least one handheld unit and process data requests by directing searches to databases of said at least one computer system and data sources on an Internet;

a gateway in said at least one computer system to Internet content provider (ICP) sites providing data tailored for mobile users;

an on-line conversion utility in said at least computer system to convert desktop formatted information from preselected ICPs to mobile format;

a search engine in said at least one computer system, the search engine being operative to access a plurality of databases, each database having an associated speed of response and being accessible by the search engine in an order based on the associated speeds of response, the search engine being adapted to convert Internet desktop screens to mobile screens on request; and a facility in said at least one computer system to allow an ICP to simultaneously update desktop pages and mobile pages held in said tailored databases.

2. The system of claim 1 further comprising a database of frequently requested data stored in said at least one computer system.

3. The system of claim 1 further comprising a database of likely to be requested data stored in said at least one computer system.

4. The system of claim 2 wherein said database of frequently requested data includes tags to allow selection of recently changed desired information, the frequently requested data being tagged to distinguish a static field from a dynamic field, and wherein the respective tags identify a most recent update of each dynamic field.

5. The system of claim 3 wherein said database of likely to be requested data includes tags to allow selection of recently changed desired information, the likely to be requested data being tagged to distinguish a static field from a dynamic field, and wherein the respective tags identify a most recent update of each dynamic field.

6. The system of claim 1 wherein the search engine is further operative to present a preselected set of options on a screen of said handheld unit, to interpret an input from a user of said handheld unit and, based on a selected option, to present narrower related options, and to continue narrowing options to a predetermined level and to transmit a last option to a wireless server, thereby facilitating the targeted information searches from the handheld unit.

7. The system of claim 1 wherein said handheld unit includes:

a targeted search capability.

8. The system of claim 1 wherein said handheld unit is operative to function as a wireless telephone.

9. The system of claim 1 wherein said handheld unit is operative to function as a personal digital assistant (PDA).

10. The system of claim 1 wherein said handheld unit is operative to provide prompts to a user.

11. The system of claim 1 wherein said at least one computer system includes:

applications to convert desktop formatted pages to handheld screen formats.

12. The system of claim 1 wherein said at least one computer system is operative to resume transfer of data with a handheld unit in the event that communication with the at least one handheld unit was interrupted and then reestablished.

13. The system of claim 1 wherein said at least one handheld unit interprets WAP protocol.

14. The system of claim 1 wherein said at least one handheld unit interprets XML protocol.

15. The system of claim 1 wherein said at least one handheld unit interprets XTML protocol.

16. The system of claim 7 wherein said targeted search capability comprises:

a broad category menu for starting a search definition;

a set of first level menus for narrowing said search definition after said broad category selection;

successive menus for further narrowing said search definition after each prior level selection; and a formatting routine to translate a final menu selection into a data request for transmitting to said at least one compute system.

17. A system to enable mobile wireless data communication by a plurality of handheld units, said system comprising:

at least one computer system including Peripherals to execute applications and support connections from said plurality of handheld units;

at least one handheld unit operative to target searches for information;

an expedited connection facility between said at least one computer system and said plurality of handheld units, the expedited connection facility being configured to automatically establish a data connection with said at least one computer system;

a dedicated mobile server information services provider (ISP) to receive mobile wireless connections from said at least one handheld unit and process data requests by directing searches to databases of said at least one computer system and data sources on an Internet;

a gateway in said at least one computer system to Internet content provider (ICP) sites providing data tailored for mobile users;

an on-line conversion utility in said at least computer system to convert desktop formatted information from preselected ICPs to mobile format;

a search engine in said at least one computer system, the search engine being operative to access a plurality of databases, each database having an associated speed of response and being accessible by the search engine in an order based on the associated speeds of response, the search engine being adapted to convert Internet desktop screens to mobile screens on request; and a facility in said at least one computer system to allow an ICP to simultaneously update desktop pages and mobile pages held in said tailored databases, wherein said at least one computer system includes:

presearch sequences, downloadable to said at least one handheld unit, to facilitate data access from said at least one handheld unit.

18. The system of claim 17 wherein said at least one computer system includes:

tutorials for the available searching techniques, downloadable to said at least one handheld unit.

19. A system for mobile, wireless, web communication between a user using at least one handheld unit and at least one computer system, comprising:

at least one handheld unit operative to initiate a telephone connection; and a telecommunications facility for receiving said telephone connection from said handheld unit and for establishing communication with said at least one computer system, said at least one computer system being operative to identity said user via a telephone connection characteristic and to identify an approximate location of said user via the wireless transmission from the handheld unit, and wherein the computer system is further operative to provide data to the handheld unit based at least in part on the identity of the user and on a status of a previous telephone connection initiated via the handheld unit.

20. The system of claim 19 wherein the at least one computer system includes a database of preselected data for access by the handheld unit.

21. The system of claim 20 wherein the at least one computer system is operative to interpret data requests received from the handheld unit and to provide in response thereto a subset of data contained in the database of preselected data.

22. The system of claim 21 wherein the at least one computer system further includes a search engine operative to seek data from at least one other database in the event that data requested by the handheld unit is not found in the database of preselected data.

23. The system of claim 22 wherein the at least one computer system is operative to count requests for data from said at least one other database and, if said count exceeds a predetermined value, to store such data in the database of preselected data.

24. The system of claim 20 wherein said database of preselected data includes data formatted to fit on a screen of said handheld unit.

25. The system of claim 24 wherein said data formatted to fit on a screen of said handheld unit is provided and updated by a content provider.

26. The system of claim 25 wherein said content provider updates a public copy of said data and said system copies said updates into the database after verifying said content provider's authorization to update the data.

27. A system for mobile, wireless, web communication between a user using at least one handheld unit and at least one computer system, comprising:

at least one handheld unit operative to initiate a telephone connection;

a telecommunications facility for receiving said telephone connection from said handheld unit and for establishing communication with said at least one computer system;

said at least one computer system being operative to identify said user via a telephone connection characteristic and to identify an approximate location of said user via the wireless transmission from the handheld unit, wherein the at least one computer system includes a database of preselected data for access by the handheld unit, and wherein the preselected data is tagged to distinguish a static field from a dynamic field, said tag identifying the most recent update of each dynamic field.

28. The system of claim 27 wherein said handheld unit interprets the tags and requests a most recent update of a predetermined dynamic field.

* * * * *

UNITED STATES PATENT AND TRADEMARK OFFICE
CERTIFICATE OF CORRECTION

PATENT NO. : 6,760,759 B1
DATED : July 6, 2004
INVENTOR(S) : Chan

It is certified that error appears in the above-identified patent and that said Letters Patent is hereby corrected as shown below:

Title page,
Item [73], Assignee, "Mtel Limited" should read -- MTel Limited --;
Item [57], ABSTRACT,
Line 17, "r" should read -- are --; and Column 7,
Line 18, "mach" should read -- much --.

Signed and Sealed this

Thirteenth Day of December, 2005

JON W. DUDAS
*Director of the United States Patent and Trademark Office*